United States Patent [19]
Matthews

[11] 3,990,331
[45] Nov. 9, 1976

[54] CABLE STRIPPING TOOL
[75] Inventor: James J. Matthews, East Haddam, Conn.
[73] Assignee: Utility Tool Corporation, East Haddam, Conn.
[22] Filed: Mar. 31, 1975
[21] Appl. No.: 563,371

[52] U.S. Cl. .......................................... 81/9.5 R
[51] Int. Cl.² ........................................ H02G 1/12
[58] Field of Search ............... 81/9.5 R, 9.5 C, 9.51; 30/90.1

[56] References Cited
UNITED STATES PATENTS

| | | | |
|---|---|---|---|
| 2,645,959 | 7/1953 | Fuchs et al. | 81/9.51 |
| 3,377,891 | 4/1968 | Horrocks | 81/9.5 C |
| 3,601,891 | 8/1971 | Destito | 30/90.1 |
| 3,659,483 | 5/1972 | Matthews | 81/9.5 C |

FOREIGN PATENTS OR APPLICATIONS

| | | | |
|---|---|---|---|
| 718,669 | 4/1942 | Germany | 81/9.51 |
| 554,637 | 7/1943 | United Kingdom | 81/9.51 |

Primary Examiner—Al Lawrence Smith
Assistant Examiner—Roscoe V. Parker
Attorney, Agent, or Firm—DeLio and Montgomery

[57] ABSTRACT

A tool for stripping covering from electrical cable which comprises a powered rotating tool which tangentially and radially cuts into the covering material and smoothly shaves a continuous cut of predetermined depth therefrom. A rotating blade shaves the covering continuously, which covering is fed between chopper blades into a discharge chute. The cable may be continuously fed through the bore of a rotating cutting tool and spindle and any length of covering removed.

4 Claims, 10 Drawing Figures

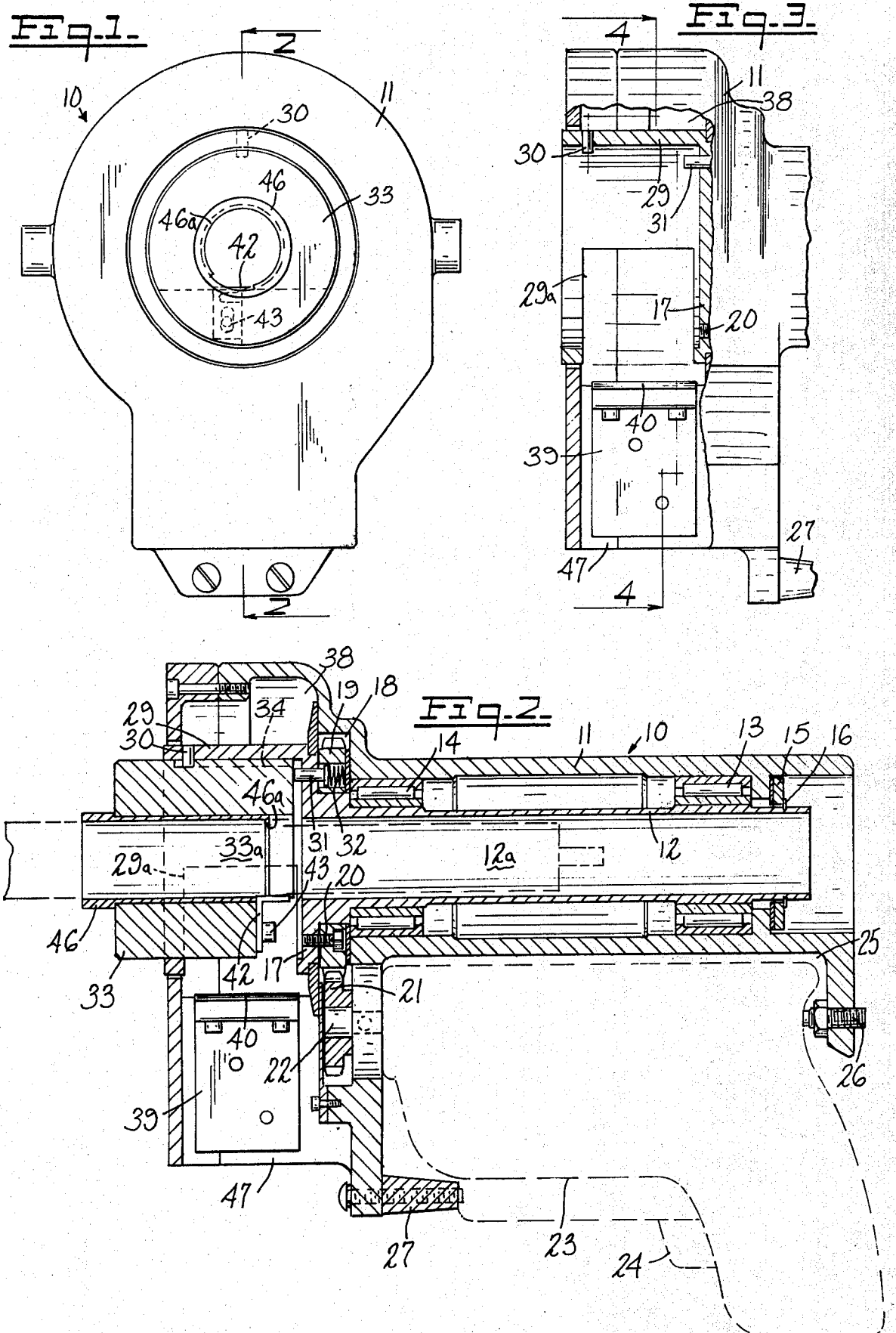

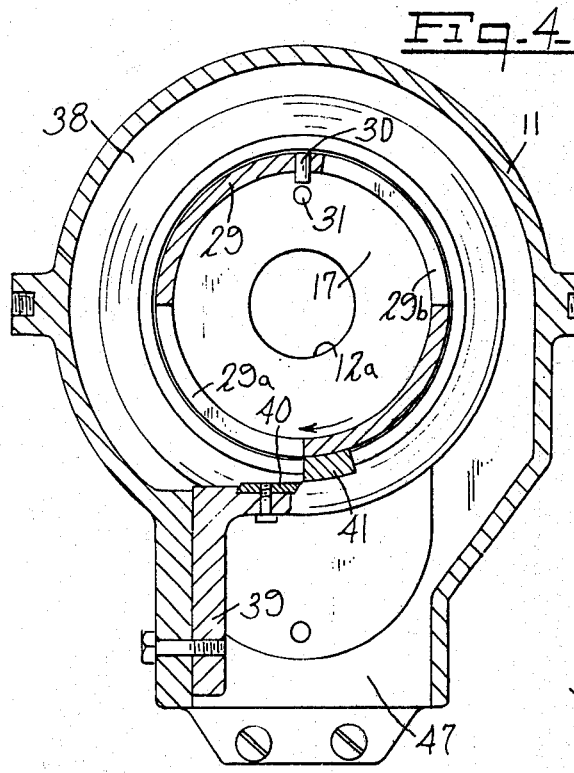
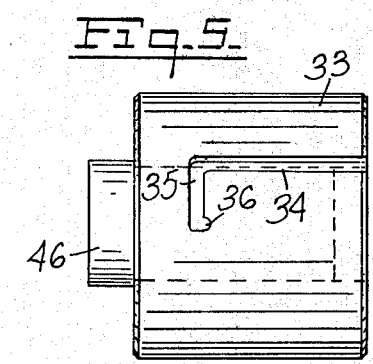
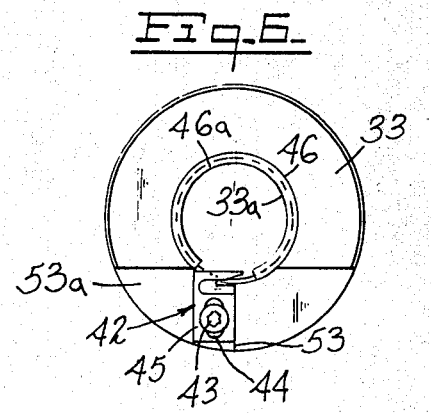
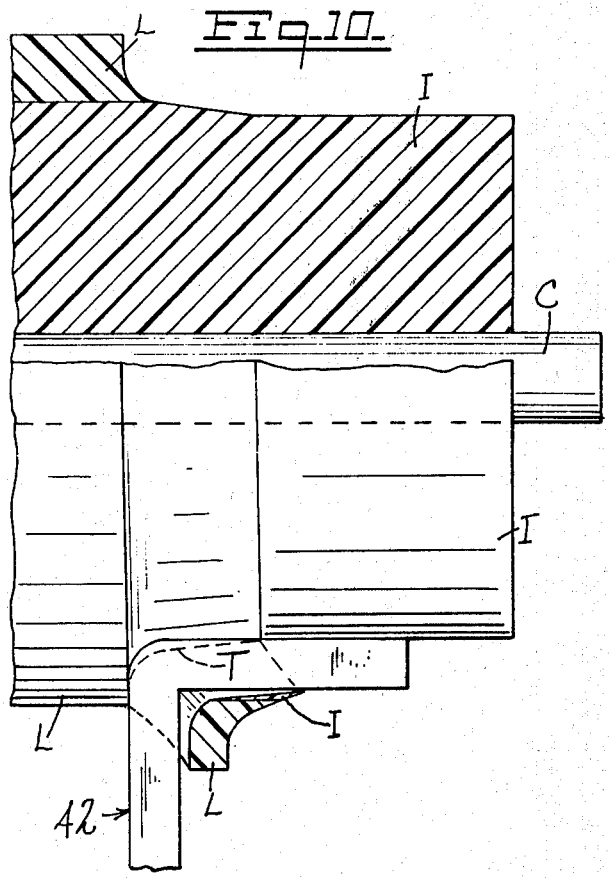
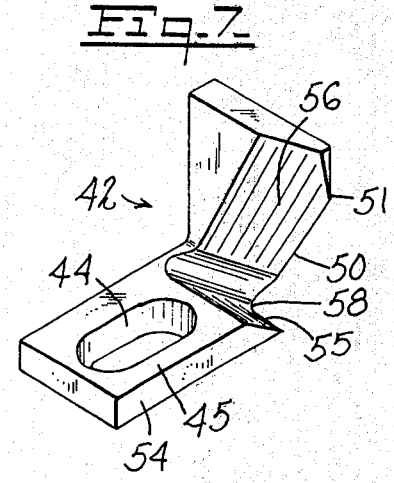
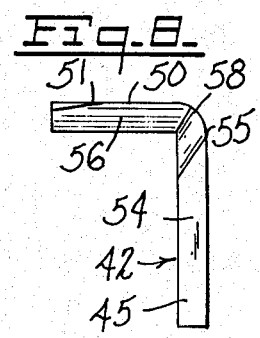
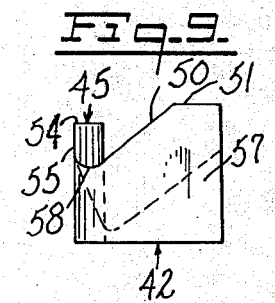

CABLE STRIPPING TOOL

This invention relates to cutting and shaving tools and more particularly relates to a tool for shaving layers of insulation from an electrical cable.

In many cases, electrical cable is enclosed in one or more bonded annular layers of semi-conducting material and insulation. Difficulty is presented in cutting an outer semi-conductor jacket and leaving a smooth finish on the intermediate layer of insulation. In many cases a foot or more of the outer jacket must be shaved and the result of this shaving operation should produce a smooth finish on the remaining insulation.

A tool in accordance with the present invention is adapted to remove unlimited lengths of bonded jacket from the end of a cable and is adapted to utilize various cutting or stripping tools to take off various depths and types of insulation and also provide a pencil end to the innermost insulation if desired.

Briefly stated, the invention in one form thereof comprises a powered tool having a spindle. The spindle at one end thereof is adapted to removably receive various cutting tools having a bore thereon so that, as the end of the cable is fed through the spindle and the spindle is rotated, a cut to a predetermine depth may be made along an unlimited length along the cable. Means are further provided for chopping and disposing of a helical cut of insulation as it is shaved or stripped from the cable.

Such means comprises a stationary chopping cutter cooperating with a rotating cutter to chop the stripped material and feed it through a discharge chute away from the cutting area so that the waste does not interfere with the work. The rotary cutting tools are interchangeable to effect different types and depths of cut.

An object of this invention is to provide a new and improved cable insulation removing tool.

Another object of this invention is to provide a powered shaving tool with new and improved interchangeable cutting means for smoothly cutting various layers of insulation from a cable.

Another object of this invention is to provide a powered cable shaving tool in which unlimited lengths of insulation may be removed from a cable.

A further object of this invention is to provide a cable shaving tool having new and improved means for chopping and disposing of layers of insulation as they are continuously cut from a cable.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

FIG. 1 is a front elevation of a tool embodying the invention;

FIG. 2 is a sectional view seen in the plane of lines 2—2 of FIG. 1;

FIG. 3 is a side elevation, partly cut away and partly in section, of a tool embodying the invention;

FIG. 4 is a view seen in the plane of lines 4—4 of FIG. 3;

FIG. 5 is a cutting bushing which is used in conjunction with the tool;

FIG. 6 is a rear end view of the bushing of FIG. 5;

FIG. 7 is a perspective view of a stripping tool which may be used in the device;

FIG. 8 is a front view of the tool of FIG. 7;

FIG. 9 is a view of the tool of FIG. 8 seen from the top thereof; and

FIG. 10 is a view of a cable partially cut away showing a stripping operation in process.

A stripping tool 10 embodying the invention, with reference to FIGS. 1 and 2, comprises a housing member 11 having a spindle 12 rotatably mounted therein on bearing assemblies 13 and 14. An end thrust-bearing 15 and locking ring 16 prevent longitudinal motion of spindle 12 in housing 11. At the other end of spindle 12 is a flange portion 17 defining with housing 11 a recess 18. A pinion 19 is attached to spindle flange 17 as by means of a plurality of bolts 20. Pinion 19 is in meshing relation with a gear 21 disposed about a spindle 22. Spindle 22 is driven from an electric motor which is shown as embodied in a hand tool 23 having an operating button or trigger 24 and adapted to be mounted within housing cavity 25 by means of retaining bolts 26 and bolted spacer 27. The tool 23 is conveniently of the type used to power an electric drill and may be specially adapted to be received in the recess 25 and have a spindle in engagement with gear 21. Alternatively, the driving tool 23 may be detachably mounted, as shown. In any event, the driving tool 23 merely provides a means for rotating spindle 12 through gear 21 and pinion 19. Extending from flange portion 17 of spindle 12 is an annular tool mounting member 29 having a pin 30 extending radially inwardly therefrom. Openings 29a and 29b are defined in member 29 for reasons hereinafter described. Another pin 31 under the bias of a spring 32, received in a recess in pinion 19, is adapted to aid in locking a cutting tool holding member 33 in annular portion 29. Tool holding member in the form of a bushing 33 is more clearly shown in FIG. 5 and includes a bayonnet type locking slot 34 in the outer periphery thereof adapted to receive pin 30. Slot 34 bends at 35 and includes a detent portion 36. When member 33 is inserted into mounting portion 29 it is first moved into annular portion 29 with pin 30 traveling along slot 34, then bushing 33 is rotated to guide pin 30 into slot portion 35. Spring 32 through pin 31 urges bushing 33 outwardly to retain pin 30 in detent 36 and thus hold bushing 33 for rotation with spindle 12.

Housing 11 defines a cavity 38 in which mounting member 29 and member 33 rotate. Disposed at the lower portion of cavity 38 is a cut-off blade-holding member 39 (FIG. 4) having thereon a removably mounted stationary chopper blade 40. Chopper blade 40 is adapted to cooperate with a rotating chopper blade 41 mounted to the exterior of mounting member 29 as shown in FIG. 4. Member 33 is partially relieved longitudinally thereof as shown in FIGS. 2 and 6 and a stripping blade 42 is adjustably secured to member 33 so that it may be adjusted radially inwardly and outwardly by means of a bolt 43 extending through elongated slot 44 in the mounting portion 45 of blade 41. A guide liner 46 may be provided in member 33. The guide liner 46 is a means for adapting bushing 33 to the size of the cable. Additionally, the position of the partially flanged end thereof in bushing 33 regulates the width of the cut. Inwardly extending flange 46a limits the forward motion of the cable until the blade has removed material. Until material is removed the cable cannot project beyond the flange 46a. Thus flange 46a together with the longitudinal positioning of the blade determines the width of cut. Without this feature varying widths of cut might occur, and scalloping of the remaining surface. The width of cut may be changed by changing the bushing 33 or liner 46 to present more or less cable to the blade. The width of cut is determined by the distance from flange 46a to the forward edge of the blade. Housing 11 defines a material discharge chute 47 below stationary chopper blade 40.

Stripping blade 42, as shown in FIGS. 7 – 9, has a cutting edge 50 which is angled backwardly from an extending free end 51 to mounting portion 45. Member 33 has a stop 53 in a rearward relieved portion 53a against which edge 54 of blade mounting portion 45 rests. Thus stripper blade 42 may be adjusted radially inwardly and outwardly for depth of cut. Edge 54 is located on a vertical plane passing through the center line of the bore of bushing 33 and liner 46. The blade 42 is formed with a cutting edge 55 directed substantially toward the axis of member 33. The blade is further formed with surface 57 and transition edge 58 between edges 50 and 55.

As the cable is initially fed into bore 33a, cutting begins at edge 55, progresses through edge 58 and ends at a point of tangency along edge 50. The gradual decrease in cutting pressure along edge 50 results in a smooth finish on the insulation. Not all of edge 50 will be cutting, since edge 50 extends on both sides over the center line of the bore of bushing 33.

As the cable is initially fed into bore 33a it is initially cut in a configuration shown by the dotted line T in FIG. 10. As the cable is further fed into the bore, a tapered tangential cut parallel to the axis of the cable results from the action of edge 50. The edge 55 makes a radially directed cut into the covering. Thereafter, as the cable is fed toward the blade, edge 50 shaves a smooth peripheral surface on the remaining covering.

As shown in FIG. 10, blade 42 is arranged to take off only the outer layer L of a cable which comprises a conductor C, and intermediate layer of insulation I and the outer layer L.

As member 33 with blade 42 thereon rotates as shown in FIGS. 4 and 5, the outer layer L is initially cut at the junction or merger of edges 50 and 55, as indicated by the reference 58. This leads edge 50 into position with respect to the cable and smoothly shaves a helical strip therefrom.

The helical strip exits mounting member 29 through one of openings 29a or 29b, and is chopped off between chopping blades 40 and 41 during each revolution of the spindle.

In operation, the cable is fed into the bore of member 33 as shown in FIG. 2. The drive motor is energized and spindle 12 and member 33 are rotated thereabout and cutting blade 42 commences shaving the outer layer L as the cable is fed into and through bores 33a and 12a. After the outer layer L is removed a given length along the cable the member 33 may be changed and a different blade holding member inserted in spindle mounting member 29 adapted to strip the intermediate insulation I down to the cable C. Thereafter, if desired another blade holding member with a pencilling cutting tool thereon may be inserted to pencil down the end of the remaining intermediate insulation. The end of the cable is suitable for connection or splicing as the case may be.

It may thus be seen that the objects of the invention set forth as well as those made apparent from the preceding description are efficiently attained. While preferred embodiments of the invention have been set forth for purposes of disclosure further embodiments of the invention as well as modifications to the disclosed embodiments which do not depart from the spirit and scope of the invention may occur to others skilled in the art. Accordingly, the appended claims are intended to cover all embodiments and modifications of the invention which do not depart from the spirit and scope of the invention.

What is claimed is:

1. A tool for cutting material from electrical cable where the cable has one or more annular layers of material about the cable, comprising, a housing member, a hollow spindle rotatably mounted in said housing, said spindle including a cutting tool mounting portion at one end thereof, a cutting tool and holder therefor mounted in said mounting portion and having a bore therethrough aligned with said hollow spindle, said tool being positioned on said holder to cut tangentially and radially into a cable fed longitudinally into said bore and to remove a continuous helical cut therefrom as the cable is moved through said bore and spindle, and power means for rotating said spindle, said mounting portion being of enlarged diameter with respect to the remainder of said spindle and having at least one aperture therein to permit material cut from the cable to exit therethrough, a discharge chute being provided in said housing below said mounting portion, a stationary chopper blade being mounted in said housing above said chute and a cooperating chopper blade being mounted on the outer periphery of said mounting portion.

2. The tool of claim 1 further including means for limiting the width of cut of material from the cable as the cable is fed through said spindle.

3. The tool of claim 2 wherein the width limiting means includes a bushing having an inwardly extending flange to engage the end of said cable and limit the width of cut by said blade.

4. A tool for cutting material from electrical cable where the cable has one or more annular layers of material about the cable, comprising, a housing, a hollow spindle mounted in said housing, a cutting tool holder mounted on one end of said spindle, said holder having a bore therethrough coaxial with the bore of the spindle, means for rotating the spindle and holder relative to the housing, a cutting tool mounted in said holder with a cutting edge projecting into the bore of the holder, said spindle having at least one aperture therethrough adjacent the tool holder to permit material cut from the cable to exit therethrough, the housing being provided with a discharge chute adapted for communication with an aperture, the spindle and housing being provided with chopping means for further cutting the material cut from the cable.

* * * * *